Dec. 31, 1929.  G. L. SMITH  1,742,014

FASTENING DEVICE

Filed Dec. 13, 1927

Inventor:
George L. Smith.
by his atty

Patented Dec. 31, 1929

1,742,014

UNITED STATES PATENT OFFICE

GEORGE L. SMITH, OF BOSTON, MASSACHUSETTS

FASTENING DEVICE

Application filed December 13, 1927. Serial No. 239,799.

This invention relates to a fastening device and particularly to a device for fastening a windshield to the front of an automobile radiator.

The object of the invention is to provide a device which may be inserted through a slot provided therefor in a windshield and then inserted within the spaces between the plates of an automobile radiator, the device being constructed of rubber or other similar compressible material reinforced by a metal shank and being adapted to be compressed as it enters the spaces and frictionally engage the opposite surfaces of the plates.

The invention consists in a fastening device as set forth in the following specification and particularly as pointed out in the claims thereof.

Referring to the drawings.

Like numerals refer to like parts throughout the several views of the drawings.

Figure 1:
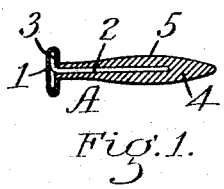
Figure 1 is a central longitudinal section through a fastening device embodying my invention.
Figure 3:
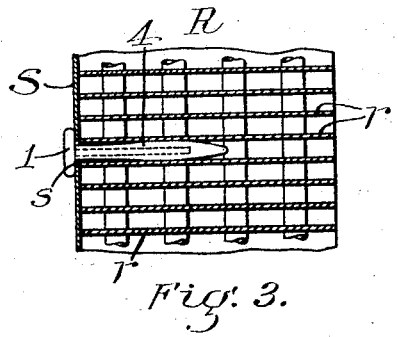
Fig. 3 is a detail view of a portion of a familiar type of automobile radiator together with a portion of a windshield, illustrating the manner of attaching said shield to said radiator by a fastening device of my invention.
Figure 2:
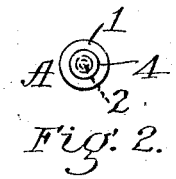
Fig. 2 is an end elevation of the fastening device.

In the drawings, referring particularly to Figs. 1 to 3 inclusive, the fastening device A embodies therein a head portion 1 of pressed sheet material and 2 is a shank portion which projects longitudinally from the head portion 1, the shank being bent at 3 to form a head portion which is inserted in a well known manner within the head 1. Located upon the shank 2 is a body portion 4 which consists of a covering of any suitable flexible, compressible material such, for example, as rubber, or the like. An intermediate portion of the body 4 flares or curves outwardly at 5 and when the device is inserted within the spaces between plates $r$ of a radiator R, the flaring sides of the fastener will frictionally engage the opposite surfaces of two plates $r$, being compressed to such an extent that they will tightly grip the faces of the plates.

In use, the fastening device A is inserted through a slot $s$ provided therefor in a shield S and with the head 1 of the fastener resting against the outer surface of the shield the fastening device is inserted within the spaces of the radiator R, being pushed rearwardly within said spaces until the rear surface of the shield is in engagement with the front of the radiator. As the fastening device is pushed rearwardly within the radiator, the flaring side of the body portion 4 of the fastener will be compressed and will frictionally engage the plates $r$ in a manner to securely hold the fastening device within the radiator.

Figure 4:
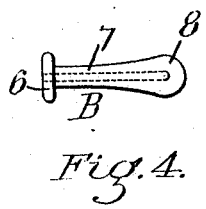
Fig. 4 is a side elevation of another form of fastening device embodying my invention.
Figure 5:
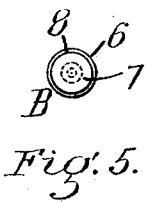
Fig. 5 is an end view of the device illustrated in Fig. 4.

In Figs. 4 and 5 I have illustrated an embodiment of my invention in which a fastener B embodies therein a head 6 and a body portion 7 formed integral with each other and constructed of any suitable flexible, compressible material. In this form of device the end of the body portion opposite the head 6 flares or curves outwardly at 8 and when the device is utilized in securing a shield to a radiator the flaring end portion 8 frictionally engages the plates $r$ of the radiator R and thereby holds the fastener securely within the radiator.

Figures 6, 7:
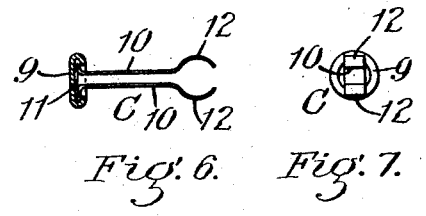
Fig. 6 is a sectional elevation of another form of fastening device embodying my invention.
Fig. 7 is an end view of the device illustrated in Fig. 6.

In Figs. 6 and 7 a fastener C embodies therein a head portion 9 of pressed sheet material, and projecting longitudinally from said head portion are a pair of arms 10 constructed of resilient material, and said arms are joined together at 11 and secured within the head portion 9 in a well known manner. The outer end portions of the arms 10 curve outwardly in opposite directions at 12.

When this device is utilized in securing a shield to a radiator, said device is inserted within the spaces of the radiator in such a manner that the opposite outer surfaces of the curved portions 12 will engage the opposite surfaces of the plates 8 and frictionally hold the device within the radiator.

Figure 8:
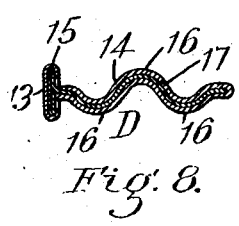
Fig. 8 is a central longitudinal section through another form of fastening device embodying my invention.
Figure 9:
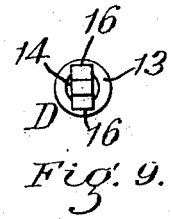
Fig. 9 is an end elevation of the device illustrated in Fig. 8.

In Figs. 8 and 9 still another modified embodiment of the invention is illustrated in which a fastener D embodies therein a head 13 of sheet material, and a shank 14 of resilient material projects longitudinally from the head 13, said shank being provided with a head portion 15 which is firmly secured within the head 13. The shank 14 is bent to curve outwardly in opposite directions at 16 and the entire shank is covered with a flexible covering 17, such as rubber or the like.

When this device is utilized in securing a shield to a radiator, the outer portions of the curved sides 16 will engage the opposite surfaces of the plates r and thereby secure the fastener to the radiator.

I claim:

1. A fastening device of the character described comprising in combination, a head, and a unitary, compressible body portion projecting from said head and tapering from an intermediate point thereof longitudinally in opposite directions.

2. A fastening device of the character described comprising, in combination, a head, a unitary compressible body portion projecting from said head, and means also projecting from said head to reinforce said body portion.

3. A fastening device of the character described comprising, in combination, a head, and a unitary compressible body portion projecting from said head and tapering from an intermediate point toward the opposite ends thereof.

4. A fastening device of the character described comprising, in combination, a head, a shank mounted in said head, and a covering of compressible material upon said shank and tapering from an intermediate point toward the opposite ends of said shank.

In testimony whereof I have hereunto set my hand.

GEORGE L. SMITH.